US008544086B2

(12) United States Patent
Field

(10) Patent No.: US 8,544,086 B2
(45) Date of Patent: Sep. 24, 2013

(54) TAGGING OBTAINED CONTENT FOR WHITE AND BLACK LISTING

(75) Inventor: Scott A Field, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1408 days.

(21) Appl. No.: 11/450,608

(22) Filed: Jun. 9, 2006

(65) Prior Publication Data

US 2006/0230452 A1  Oct. 12, 2006

Related U.S. Application Data

(63) Continuation-in-part of application No. 10/977,484, filed on Oct. 29, 2004.

(51) Int. Cl.
*G06F 12/14* (2006.01)
*G06F 12/16* (2006.01)
*G06F 7/04* (2006.01)
*G06F 17/30* (2006.01)
*G06F 11/00* (2006.01)

(52) U.S. Cl.
USPC .......... 726/22; 726/2; 726/5; 726/24; 726/26; 713/164

(58) Field of Classification Search
USPC .................. 726/22, 24, 26, 2, 5; 713/164
See application file for complete search history.

(56) References Cited

U.S. PATENT DOCUMENTS

| 6,275,983 | B1 * | 8/2001 | Orton et al. ................... 717/116 |
| 6,728,716 | B1 * | 4/2004 | Bhattacharya et al. ............... 1/1 |
| 6,766,314 | B2 * | 7/2004 | Burnett .......................... 707/694 |
| 6,880,110 | B2 * | 4/2005 | Largman et al. ................. 714/38 |
| 7,243,236 | B1 * | 7/2007 | Sibert ............................ 713/179 |
| 7,287,279 | B2 * | 10/2007 | Bertman et al. ................. 726/23 |
| 7,305,704 | B2 * | 12/2007 | Ofek et al. ....................... 726/15 |

(Continued)

FOREIGN PATENT DOCUMENTS

| EP | 1 408 393 A2 | 4/2004 |
| WO | 01 88673 A2 | 11/2001 |
| WO | 02 05072 A2 | 1/2002 |

OTHER PUBLICATIONS

Boykin, P.O., and V. Royehowdbury, "Personal Email Networks: An Effective Anti-Spam Tool," Feb. 3, 2004, XP002468359, University of Calif., L.A. <http://arxiv.org/PS_cache/cond-mat/pdf/0402/0402143v1.pdf> [retrieved Jan. 30, 2008].

(Continued)

*Primary Examiner* — Edan Orgad
*Assistant Examiner* — Kari Schmidt

(57) ABSTRACT

A system and method for providing enhanced security with regard to obtained files is presented. Upon obtaining a file from an external location, the obtained file is tagged with tagging information regarding the origin of the obtained file. Additionally, an operating system suitable for execution on a computing device is also presented. The operating system includes at least one application-callable function (API) for obtaining content from an external location. Each application-callable function for obtaining content from an external location is configured to associate tagging information with each obtained file, the tagging information comprising the origin of the obtained file. The origin of the obtained file can be used for subsequent security policy decisions, such as whether to allow or block execution or rendering of the content, as well as whether the content will be accessed in a constrained environment such as a "sandbox" or virtual machine.

24 Claims, 12 Drawing Sheets

(56) References Cited

U.S. PATENT DOCUMENTS

| | | | |
|---|---|---|---|
| 7,343,619 B2* | 3/2008 | Ofek et al. | 726/2 |
| 7,367,045 B2* | 4/2008 | Ofek et al. | 726/2 |
| 7,380,277 B2 | 5/2008 | Szor | 726/24 |
| 7,398,398 B2* | 7/2008 | Ofek et al. | 713/180 |
| 7,694,328 B2* | 4/2010 | Joshi et al. | 726/2 |
| 7,779,472 B1* | 8/2010 | Lou | 726/24 |
| 2002/0069198 A1* | 6/2002 | Stebbings et al. | 707/7 |
| 2002/0143770 A1* | 10/2002 | Schran et al. | 707/10 |
| 2002/0144140 A1* | 10/2002 | Ellison et al. | 713/200 |
| 2002/0147923 A1* | 10/2002 | Dotan | 713/200 |
| 2002/0199116 A1* | 12/2002 | Hoene et al. | 713/201 |
| 2004/0010703 A1* | 1/2004 | Kouznetsov et al. | 713/200 |
| 2004/0148281 A1* | 7/2004 | Bates et al. | 707/3 |
| 2004/0172551 A1 | 9/2004 | Fielding | |
| 2004/0181691 A1* | 9/2004 | Armingaud et al. | 713/201 |
| 2005/0071432 A1* | 3/2005 | Royston, III | 709/206 |
| 2006/0010497 A1* | 1/2006 | O'Brien et al. | 726/26 |

OTHER PUBLICATIONS

Morar, J.F., and D.M. Chess, "Can Cryptography Prevent Computer Viruses?" *Proceedings of the 10th Annual Virus Bulletin Conference*, Orlando, Fla., Sep. 27-29, 2000, pp. 128-138.

* cited by examiner

TAGGING OBTAINED CONTENT FOR WHITE AND BLACK LISTING

CROSS-REFERENCE TO RELATED APPLICATION

The present invention is a continuation-in-part of U.S. patent application Ser. No. 10/977,484, filed Oct. 29, 2004.

BACKGROUND

An unfortunate reality of operating a computer, especially one connected to a network, is that the computer is constantly under attack. These attacks come in a variety of forms including, but not limited to, computer viruses, worms, computer exploits (i.e., abusing or misusing legitimate computer services), adware or spyware, and the like. While the mechanism of operation for each of these various computer attacks is quite distinct, in general, they are all designed to carry out some unauthorized, usually unwelcomed, often destructive, activity on the computer. For purposes of the present invention, these attacks will be generally referred to hereafter as malware.

As malware is a reality for computers generally, and for network computers in particular, various tools have been devised and deployed to prevent malware from performing its malicious intent on a computer. These tools include firewalls, proxies, and security settings on vulnerable applications. However, the most commonly used tool in protecting a computer against malware is antivirus software.

As those skilled in the art will appreciate, most antivirus software operates as a pattern recognition service. In particular, when a file is received by a computer, irrespective of whether the file is an executable, word processing document, image, or the like, the antivirus software protecting that computer "analyzes" the file to determine whether it is known to be malware. The antivirus software "analyzes" the file by generating a hash value, referred to as a signature, for the file. This signature is generated such that it is extremely unlikely that another file will have the same signature, and is therefore considered unique to that file. Once the signature is generated, the signature is then compared against other signatures of known malware in a so-called signature file. Thus, if the file's generated signature matches a signature of known malware in the signature file, the antivirus software has discovered the file to be malware and takes appropriate action.

Unfortunately, the signature recognition requires that the malware be previously known (and identified) in order to protect the computer from the malware. Thus, antivirus software is not a time-zero protection, i.e., protecting the computer from malware as soon as it is released on the network, or time-zero. Instead, a vulnerability window exists during which a new, unknown malware is released, and the time that antivirus software is able to protect a computer from the new malware.

FIG. 1 is a block diagram of an exemplary timeline 100 illustrating the vulnerability window associated with current antivirus software's signature recognition. As shown in FIG. 1, at some point in time, as indicated by event 102, a malicious party releases a new, unknown malware onto a network, such as the Internet. Obviously, once the new, unknown malware is released, computers connected to the network are at risk or vulnerable. Hence, the vulnerability window is opened.

While the actual time for detecting a new malware on a network depends on numerous factors, including the virulence of the new malware, according to available statistics, it generally takes between four hours to three days for the antivirus software community, i.e., antivirus software providers, to detect or become aware of the new malware. Once detected, as indicated by event 104, the antivirus community can begin to identify the malware. In addition to generating a signature for the new malware, identifying the malware also typically involves researching/determining the ultimate effect of the malware, determining its mode of attack, identifying system weaknesses that are exposed by the attack, and devising a plan to remove the malware from an infected computer.

After having identified the malware, which typically takes approximately four hours (at least for signature identification), an antivirus provider will post an updated signature file on its download service, as indicated by event 106. Unfortunately, computers (either automatically or at the behest of the computer user) do not immediately update their signature files. It typically takes between four hours and one week for most computers to update their signature files, as indicated by event 108. Of course, it is only after the updated signature file is downloaded onto a computer that the antivirus software can defend the computer from the new malware, thereby closing the vulnerability window 110. Indeed, depending on individual circumstances, such as when the computer owner is on vacation, updating a computer with the latest signature files can take significantly longer than one week.

As can be seen, a new, unknown malware has anywhere from several hours to several weeks to perform malicious havoc on the network community, unchecked by any antivirus software. Antivirus software is not time-zero protection. The good news is that most computers are protected before a malware tries to attack any one computer. Unfortunately, some are exposed during the vulnerability window and are infected by the malware. To most, especially those that rely heavily upon their computers, this vulnerability window is entirely unacceptable.

Those skilled in the art will readily recognize that it is important to generate a signature for a file such that the signature uniquely identifies the file that can be used to identify malware. Sophisticated algorithms and mathematics are involved with computationally generating a signature that positively identifies a file and, at the same time, does not identify any other file. Unfortunately, in order to generate a signature that uniquely identifies the file, the algorithms used are extremely sensitive to the contents of the file. Any modification to a file will cause the signature generation algorithm to generate a different signature than for the original file. In other words, a simple, cosmetic change to a known malware will cause the signature generation algorithm to return an entirely different signature. Thus, a cosmetic change to a known malware (i.e., one identified by its signature in a signature file) is usually sufficient to enable the modified malware to escape detection, at least until the modified malware has been recognized, and its signature generated and stored in a signature file.

The problem of malware generally is compounded by the fact that malware is often embedded in user modifiable files. For example, malware may be disguised in and distributed as an executable script embedded within a word processing document. In these cases, the malware portion (i.e., the embedded script) is entirely unrelated to the editable portion of the document. Thus, modifications, small or large, to the data area of the word processing document will cause the complete malware file to yield a different signature than its original, while the embedded malicious script remains unaffected. These user-modifiable files include, but are not limited to, word processing documents, spreadsheets, images, HTML documents, and the like. Furthermore, malware creators, in order to stay ahead of antivirus software detection, have begun creating self-modifying malware: documents that randomly modify some portion of the file in order to remain undetected antivirus software. Clearly, then, in many cases, it is very difficult to stay ahead of the malware that is released, especially when malware must be known in order to be stopped.

Of course, as mentioned above, newly-released malware is not always immediately identifiable by any signature. For this reason, many computer users restrict the locations that they visit on the Internet to trusted or known locations, i.e., locations with which they are reasonably confident that the available content is malware-free. In this manner, cautious users minimize their exposure to malware. Unfortunately, once a file is downloaded onto a user's computer, it is assumed that the file is safe for use (e.g., display, execution, editing, etc.) However, the mere presence of a file on a computer system does not mean that the file is safe. Just as with visiting only trusted internet locations, it would be beneficial if a user could, a priori, know the location from which certain content has been obtained. Armed with the knowledge of the content's origin, a user can be cautious with regard to acting upon the a file (e.g., executing or displaying a file, installing a module on a computer, and the like.) Accordingly, as files and/or content are obtained, they could be tagged with origin information. Still further, it would be beneficial if a computer system could identify the location from which a file or content has been obtained and act upon it according to its trustworthiness as identified in a set of predetermined rules, a whitelist of trusted sites, and/or a black-list of untrustworthy sites.

SUMMARY OF THE INVENTION

A computer system for providing enhanced security with regard to obtained files, the computer system is presented. The computer system includes a processor and a memory. Moreover, the computer system further includes a file system. Upon obtaining a file from an external location, the computer system is configured to tag the obtained file with tagging information regarding the origin of the obtained file.

According to additional aspects, a method for enhancing the security of a computing device with regard to a file obtained from an external source is presented. The method comprise first obtaining a file from an external source. Once or as the file is obtained from the external source, the obtained file is tagged with tagging information identifying the origin of the obtained file.

According to yet further aspects, an operating system suitable for execution on a computing device having a processor and memory is presented. The operating system comprises at least one application-callable function for obtaining content from an external location. Moreover, each application-callable function for obtaining content from an external location is configured to associated tagging information with each obtained file, the tagging information comprising the origin of the obtained file.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

According to aspects of the present invention, rather than generating a malware signature based on the entire user-modifiable document, only a portion of a document is used as a basis for generating the signature. More particularly, a malware signature is generated based on certain, more permanent portions of a user-modifiable file. By basing the malware signature on those portions of a user-modifiable document that tend to be more permanent, the ability of malware creators and self-modifying malware to escape detection through simple, cosmetic alterations is substantially reduced, if not completely eliminated.

Figure 1:
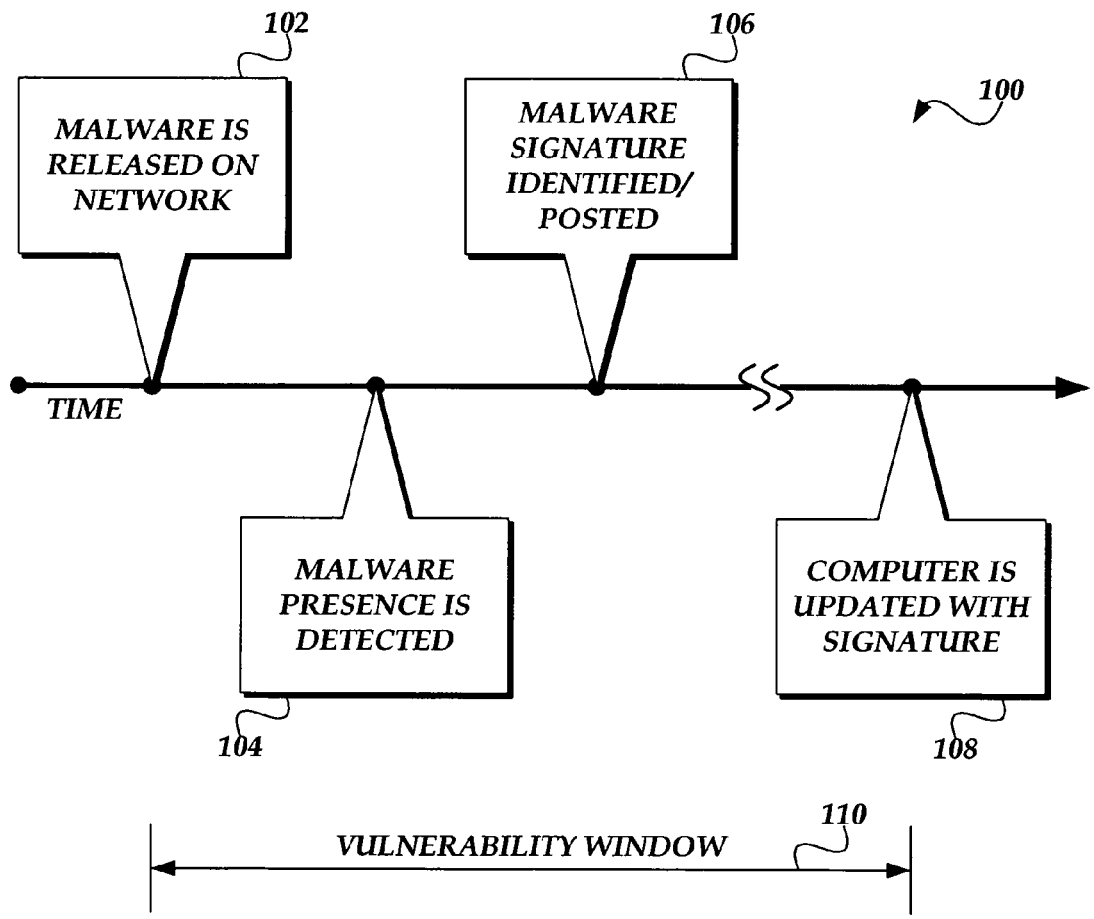
FIG. 1 is a block diagram of an exemplary timeline illustrating the vulnerability window associated with antivirus software and, particularly, to signature recognition methods.
Figure 2:
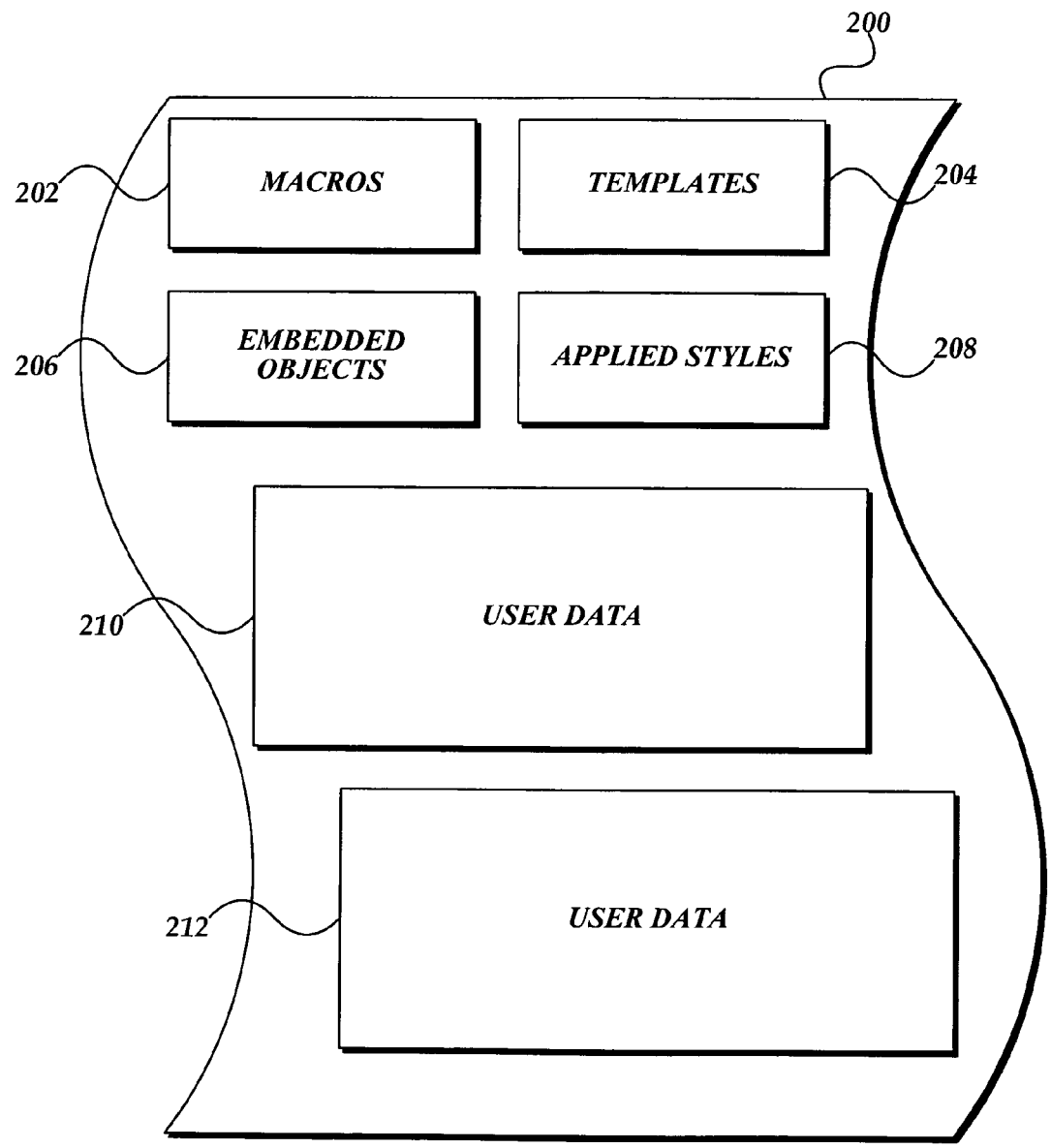
FIG. 2 is a block diagram illustrating an exemplary user-modifiable document.

Those skilled in the art will appreciate that a user-modifiable document includes numerous elements, some of which tend to be more permanent than others. It is generally those more permanent elements/portions of the document upon which the present invention bases its signature. FIG. 2 is a block diagram illustrating an exemplary user-modifiable document 200 and for discussing the various elements of the user-modifiable document.

As shown in FIG. 2, the user-modifiable document 200 includes various elements/portions such as macros 202, templates 204, embedded objects 206, such as Active X and COM objects, applied styles 208, and the like. Each of these elements tends to be more permanent, i.e., is not modified each time a user edits the user-modifiable document. Additionally, these are the types of document elements that contain the "core" of the malware. For example, malware creators embody their malicious designs in the form of macros or Active X controls. These are then place in user-modifiable files, such as word processing documents, spreadsheets, or images. Any information in the user data areas, such as user data areas 210 and 212, typically have little or no effect on the malware per se, but often include information that would entice a user to activate and/or release the malware onto the unsuspecting user's computer. Thus, as already mentioned, due to the nature of current signature-based detection systems, variants of malware are easily produced through cosmetic changes to the document.

It should be understood that while the present discussion may use the term "user-modifiable" file, it is for description purposes only, and represents only one type of file applicable for the present invention. As mentioned above, quite often malware, distributed as applications, will include data areas whose modification does not affect the functionality of the malware. These data areas will be referred to hereafter as superficial data areas. User-modifiable files include superficial data areas, i.e., areas that a user (or embedded malware) may modify without affecting the embedded malware. Accordingly, it should be understood that "user-modifiable" files or files with superficial data areas include all files that include data areas whose modification affects the functionality of the malware (referred to generally as the more permanent portions of the file) and areas whose modification has no functional effect on the malware (referred generally as user-modifiable data areas or as superficial data areas.)

Figure 3:
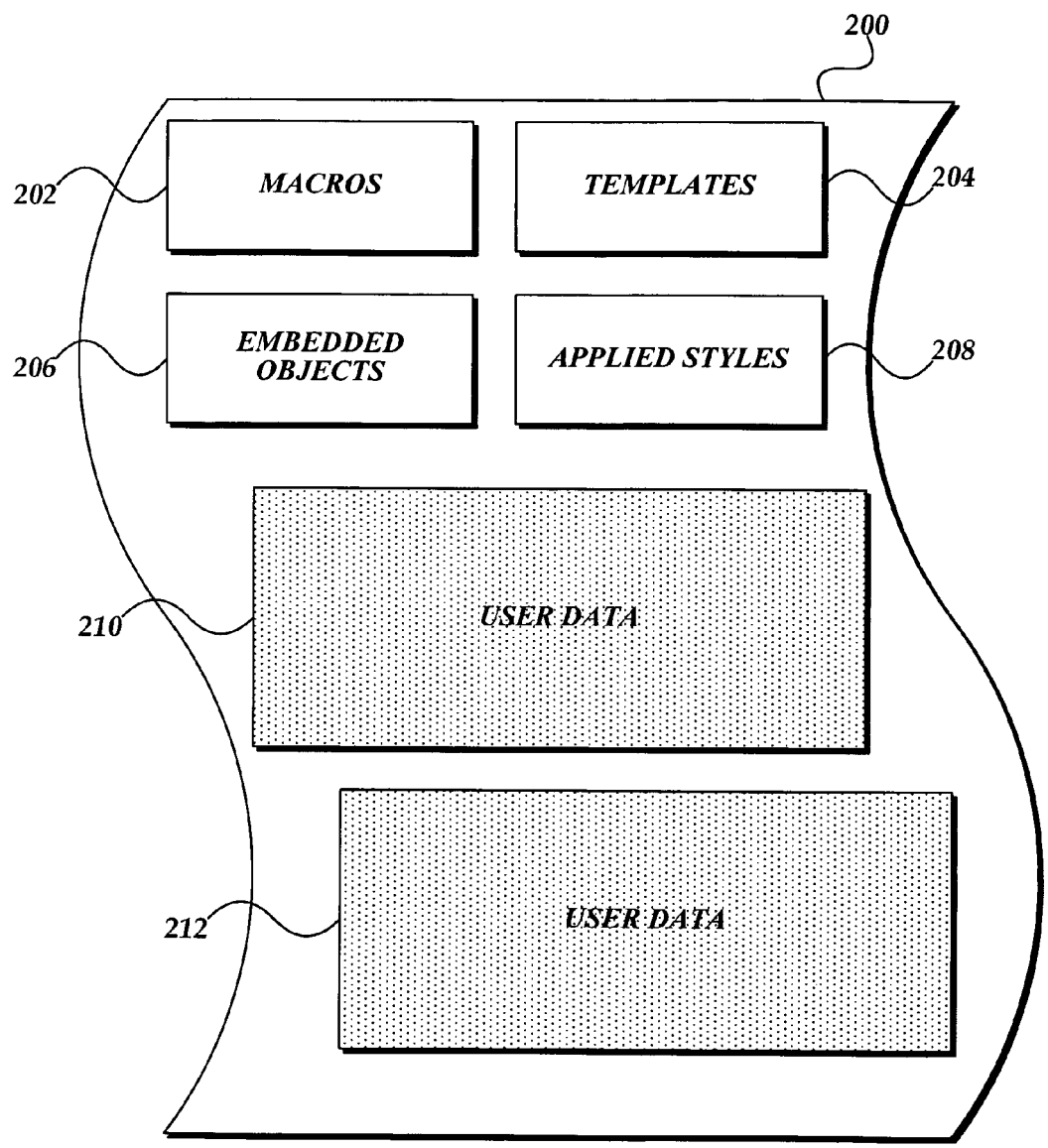
FIG. 3 is a block diagram illustrating the exemplary user-modifiable document of FIG. 2, and for further illustrating that only certain segments of the file are needed to develop a signature for the file.

FIG. 3 is a block diagram illustrating the exemplary user-modifiable document 200 and further illustrating that only portions of the documents are used in generating a signature for the document. As mentioned above, according to the present invention, when generating a file signature, the more permanent portions of a user-modifiable document, such as, but not limited to, macros 202, templates 204, styles 208, and embedded objects 206, are identified and used. Conversely, the user data portions, such as user data areas 210 and 212, are filtered out of the signature generation process.

As mentioned above, even when basing malware signatures on more permanent aspects of a user-modifiable file, malware detection does not always provide time-zero protection, i.e., protection the moment a malware file is released. According to aspects of the present invention, in order to provide time-zero protection to a computer or network, files that are trusted not to be malware are identified on a so-called white list. As a file arrives at a computer, but before it can be utilized on the computer, a signature for that file is generated and compared against a white list of files that are known to be trusted. According to further aspects of the present invention, the signature of the file, if the file is a user-modifiable file, is based on its more permanent portions, as discussed above. In this manner, a user-modifiable file can be edited and easily distributed among computers with full confidence that distribution of the file is trustworthy. Conversely, those files that cannot be matched against signatures in the white list are considered untrustworthy, and security policies can be carried out to protect the computer and/or network. In this manner, time-zero protection is realized.

Figure 4:
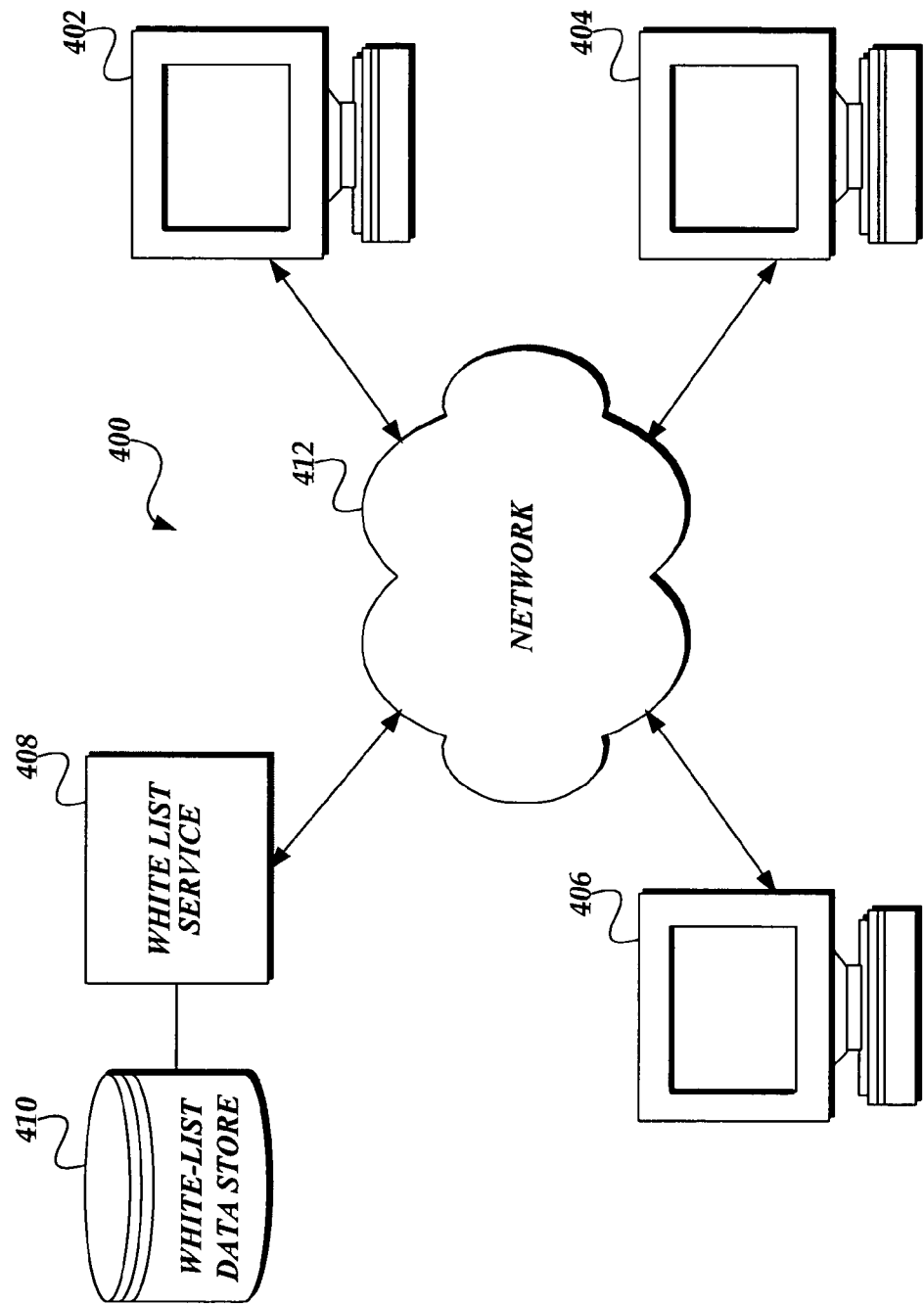
FIG. 4 is a pictorial diagram illustrating an exemplary networked environment suitable for implementing aspects of the present invention.

According to the present invention, a white list may be locally stored on a computer, on a trusted network location, or both. The present invention is not limited to any one configuration or arrangement. Additionally, according to one embodiment, a computer may rely upon a plurality of white lists for a variety of reasons, including efficiency and redundancy. FIG. 4 is a pictorial diagram illustrating one exemplary network configuration 400 of a white list available to a plurality of computers. As shown in FIG. 4, the exemplary network configuration 400 includes a white list service 408 that receives requests from computers, such as computers 402-406, to identify whether a received file is white listed. The white list service 408 may be a Web server connected to the Internet 412, but the present invention is not so limited.

While the white list service 408 may be strictly a white listing service, i.e., one that provides information as to files on a white list, alternatively, the white list service may provide information for both white listed files as well as black listed files, i.e., known malware.

The white list service 408 is illustrated as being coupled to a white list data store 410. The white list data store includes those files that have been identified as trustworthy files. In one embodiment, the white list data store 410 is a database of white listed files. While the present illustration identifies the white list service 408 and white list data store 410 as separate entities, it is a logical separation for illustration and discussion purposes. In an actual embodiment, the white list data store and the white list service may be incorporated as a single entity, or as a service offered on a computer.

While in one embodiment, the white list data store includes only signatures of white listed files, the present invention is not so limited. Quite frequently, the level of trust that a number of files has varies between files. For example, a file known to have been created by a user may enjoy a high level of trust by that same user. Similarly, a file created by a trusted party, accompanied by a digital signature attesting to its authenticity, may enjoy the highest level of trust. Alternatively, a file that has been quarantined in a so-called "sandbox" for several days, and that has not exhibited any signs of possessing malware, may be "trusted," but perhaps to a lesser degree than one digitally signed by a trusted source. Yet another alternative is that a particular file may receive positive feedback from users that it can be trusted. Such file may receive a trust level based on the volume of feedback regarding its trustworthiness, and be especially useful with regard to identifying spyware and adware. Thus, according to aspects of the present invention, the white list data store includes more than just file signatures of "trusted" files.

While the preceding discussion of the present invention has been made in reference to a computer, it should be understood that the present invention may be implemented on almost any computing device, including, but not limited to, computers that have a processor, a communications connection, memory for storing information, and being capable of performing file signature generation. For example, a suitable computing device may be a personal computer, a notebook or tablet computer, a personal digital assistant (PDA), mini- and mainframe computers, hybrid computing devices (such as cell phone/PDA combinations), and the like.

Figure 5:
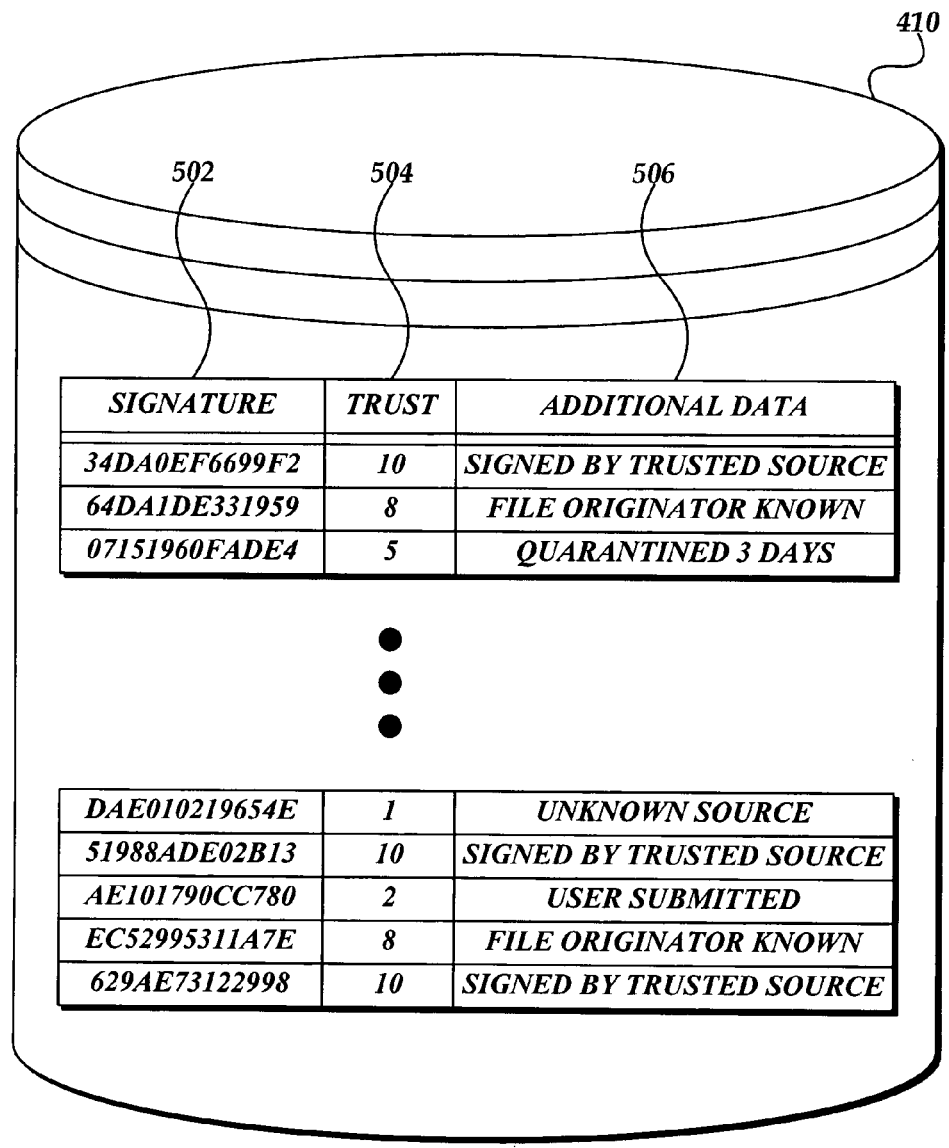
FIG. 5 is a block diagram illustrating an exemplary white list data store suitable for use in the present invention.

FIG. 5 is a block diagram illustrating exemplary fields that may exist in a white list data store 410. In one embodiment, the white list data store 410 will store a record for each white listed filed in the data store, and each record includes one or more fields for storing information. As shown in FIG. 5, each record in the white list data store 410 includes a signature field 502. The signature field stores the file signature, whether or not the file signature was generated based only on more permanent portions of a file. As mentioned above, it is frequently useful to identify the level of trust that a particular file enjoys. Thus, the exemplary records also include a trust field 504. As illustrated, the trust field includes a numeric value from 1 to 10, with 10 representing the highest trust and 1 the lowest. However, it should be understood that this ranking is illustrative only, and should not be construed as limiting upon the present invention. As yet a further alternative, the trust field 504 could also be used to identify malware. For example, if a file is assigned a trust level of 0, this could be an indication that the file is known to be malware.

Also shown in the white list data store 410 is an additional data field 506. The additional data field 506, as its name suggests, includes information that may be useful to a user with respect to the white listed file. As shown in FIG. 5, the additional data field could identify the reasoning behind the assigned trust level of a file, such as file originator or source, observed behaviors, lack of malware behaviors, and the like. Almost any pertinent information could be stored in the additional data field 506. Similarly, in alternative embodiments, any number of fields could be included in the white list data store 410.

Figure 6:
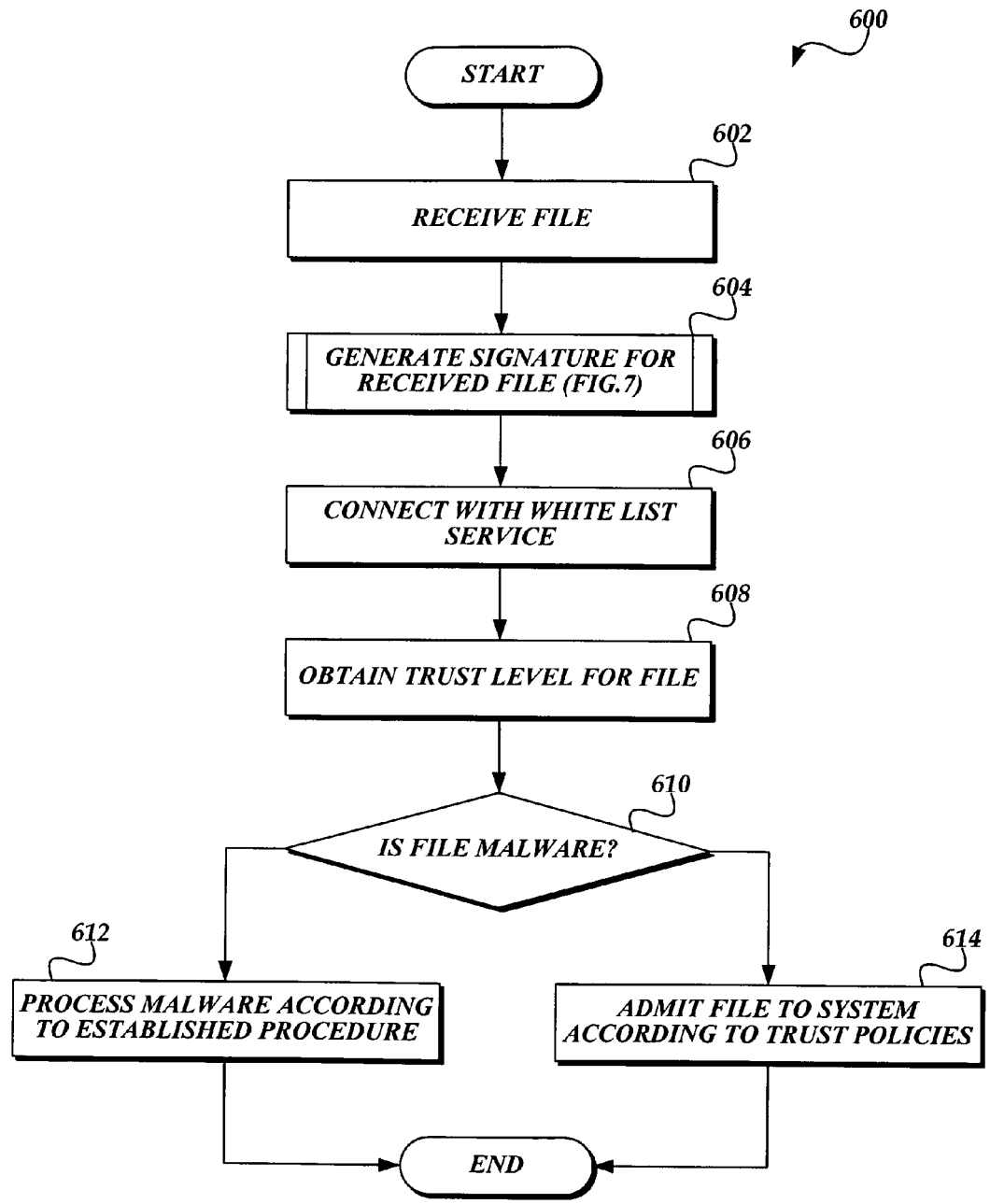
FIG. 6 is a flow diagram illustrating an exemplary routine suitable for determining whether a file is white listed as a trusted file according to aspects of the present invention.

FIG. 6 is a flow diagram illustrating an exemplary routine 600 for determining whether a file is white listed as a trusted file. Beginning at block 602, the computer receives an unknown/untrusted file, meaning that the computer does not yet know whether the file is malware, or whether it has been white listed. At block 604, a signature is generated for the received file. Generating a signature for the file is described below in regard to FIG. 7.

Figure 7:
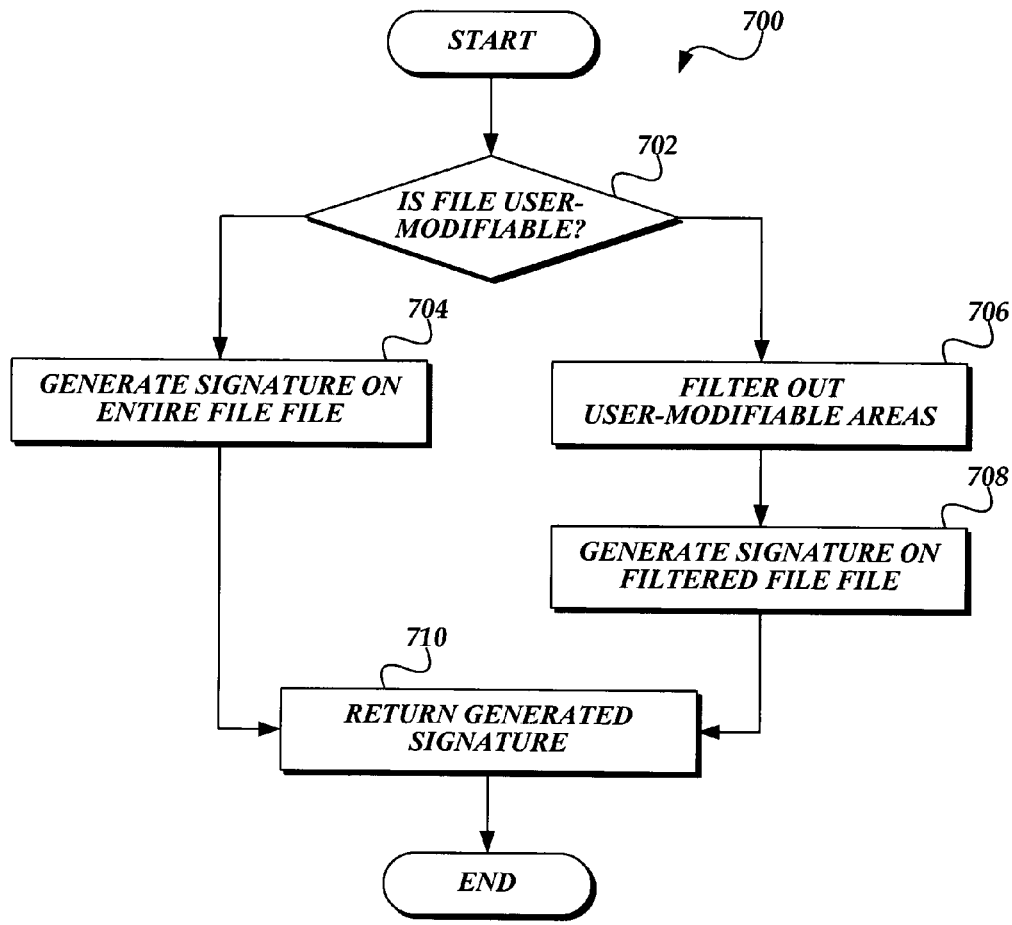
FIG. 7 is a flow diagram illustrating an exemplary generate signature routine adapted according to aspects of the present invention.

FIG. 7 is a flow diagram illustrating an exemplary subroutine 700 for generating a file signature according to aspects of the present invention, and suitable for use by the routine 600 of FIG. 6. Beginning at decision block 702, a determination is made as to whether the file is a user-modifiable file. If the file is not a user-modifiable file, at block 704, the exemplary subroutine 700 generates a signature for the file based on the entire file. Thereafter, at block 710, the exemplary subroutine 700 returns the generated signature and terminates.

If the file is a user-modifiable file, at block 706, the exemplary subroutine 700 filters out the user-modifiable portions of the file. At block 708, the subroutine 700 then generates the file's signature based on the remaining, unfiltered portions of the file. After having generated the file's signature, at block 710, the exemplary subroutine 700 returns the generated signature and terminates.

With reference again to FIG. 6, after having generated the file's signature, at block 606, the exemplary routine 600 connects with a white list service 408. As discussed above, the white list service may be a local service/file installed on the computer or on a local area network, or alternatively, a remote white list service such as identified in FIG. 4. Additionally (not shown), there may be a plurality of white list services. For example, a white list service installed on the computer may contain a small number of file signatures that are frequently encountered by the computer. If a signature is not found in the local white list service, the computer may turn to a network white list service that contains a larger number of signatures. Still further, if a signature is not found on either the local or network white list services, a remote/global white list service, such as white list service 408 of FIG. 4, may be consulted. Of course, the remote white list service 408 will likely include only files that are globally available, such as help or service documents from an operating system provider. According to one embodiment, the local white list service is aware of, and in communication with, the network white list service, and the network white list service is aware of, and in communication with, the remote white list service, such that a single request to the local white list service successively checks another if the file's signature is not found.

After connecting with a white list service, at block 608, the routine 600 submits the signature and obtains a trust level corresponding to the file. At decision block 610, assuming the white list service also identifies malware (though the present invention is not so limited), a determination is made as to whether the file was identified as malware. If so, at block 612, the routine processes the malware according to established procedures. Processing malware is well known in the art, and includes actions such as deleting the file, quarantining the file, or purging the malware from the file. Thereafter, the routine 600 terminates.

If the file is not identified as malware according to the trust level obtained from the white list service 408, at block 614, the routine 600 admits the file to the computer system according to established policies relating to the level of trust for the file. For example, if the trust level is at its highest, the computer user is likely satisfied that the file is completely trustworthy, and can admit the file to the system for any purpose. Alternatively, if the trust level is fairly low, the computer system may be programmed to admit the file to the system with certain constraints, such as, but not limited to, quarantining the file for a period of time, executing the file within a so-called sandbox, disabling certain features network ability while the file operates, and the like. After admitting the file to the computer system, the exemplary routine 600 terminates.

While the above described routine 600 includes a binary, i.e., yes/no, determination in regard to whether the file is or is not malware, in an actual embodiment, a number of determinations may be made according to the trust level associated with the file. For example, a determination may be made as to whether the trust level is greater than a value of 8, such that any file with that level, or greater, of trust is automatically admitted. Similarly, files with trust levels between 3 and 7 may be required to execute within a so-called sandbox for some period of time. Still further, files with trust levels below 3 must be quarantined before admittance to the computer system. Accordingly, the exemplary routine 600 should be viewed as illustrative only, and should not be construed as limiting upon the present invention.

As indicated above, irrespective of the ability to generate a signature on more permanent aspects of a file to identify potential malware, such signatures cannot always catch all malware. Thus, a computer user must be cautious by visiting trustworthy Web sites and only downloading files/content known or trusted to be malware-free. This is especially true as a tendency persists that once a file or content is downloaded to a user's computer, the file/content is presumed to be trustworthy and may be displayed, executed, installed, or otherwise utilized on the user's local computer system. This presumption is further exacerbated because after a file or content is obtained, there has been no legitimate way to determine its origin.

In this light, according to one embodiment, when a file is obtained from an external source (external to the local computer), the file is "tagged," i.e., associated with information identifying its origin. Tagging information may comprise a variety of forms and information including, but not limited to, a Uniform Resource Locator (URL) or Uniform Resource Identifier (URI) of the file's origin, the author of the file, the domain from which the file was obtained, and the like.

While the following description is made with regard to obtaining files from external sources, it is for illustration purposes only and should not be construed as limiting in any manner. For example, the term "file" may be viewed to include files, content, modules, data streams, and the like.

The term "obtaining" a file (or content) is used to denote more than user directed downloading of content from an external source/location. Of course, a user may obtain a file by directing an application, such as a Web browser application, to download a file to the user's local computer; but a user may also obtain files via e-mail, as a result of a file copy operation (initiated locally or externally), by recording a data stream, as a product of a system update operation, and the like. In other words, obtaining a file refers to the addition of the file from an external source to the local computer, irrespective of the action that initiated the addition of the file to the local computer.

Figure 8:
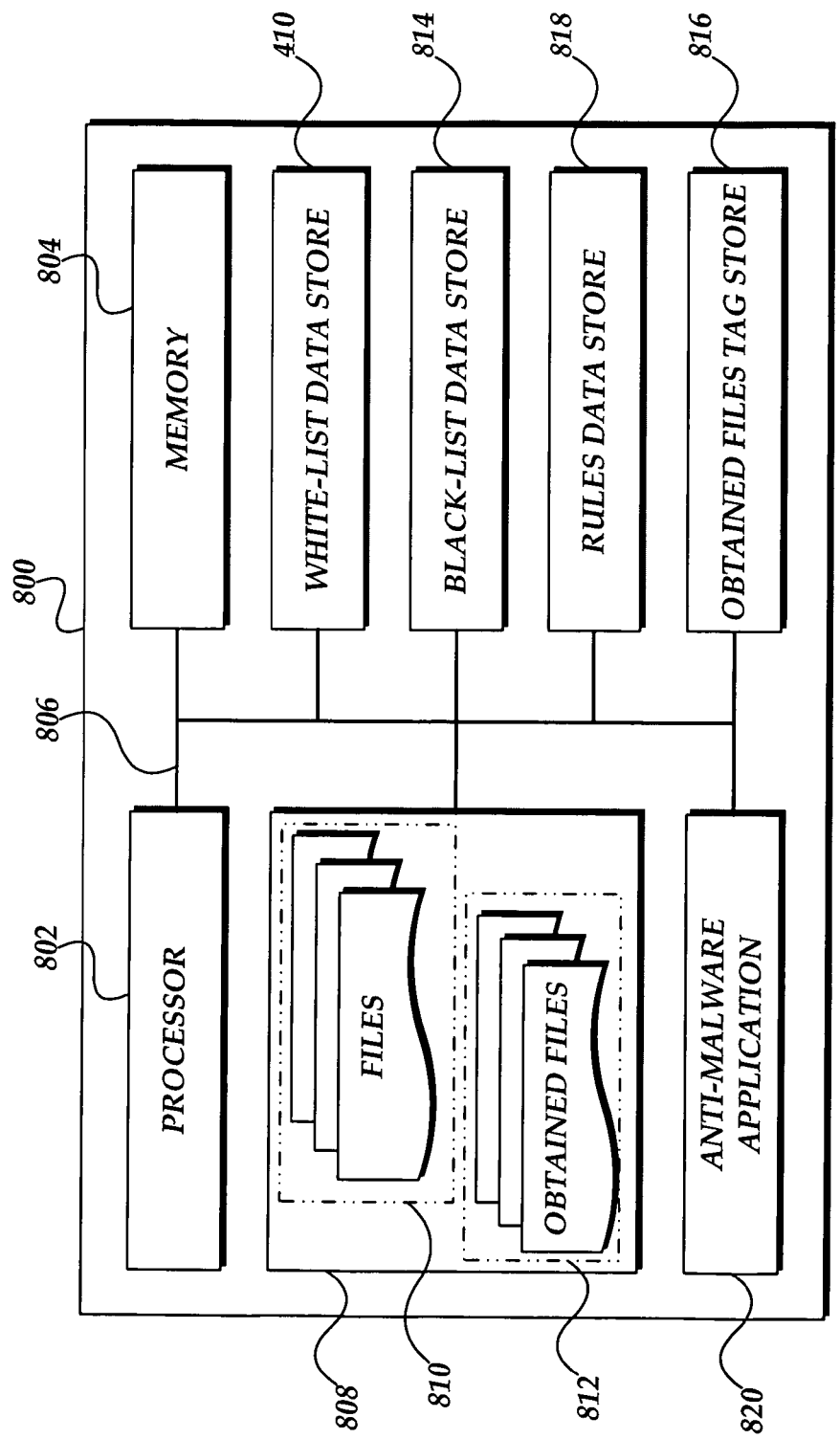
FIG. 8 is a block diagram illustrating components of an exemplary computer system suitable for tagging obtained content and acting upon obtained content according to predetermined rules.

In regard to tagging obtained files, FIG. 8 is a block diagram of exemplary components of a computer system 800 suitable for generating signatures for files (as described earlier) and/or for tagging obtained files with tagging information. As shown, the exemplary computer system 800 includes a processor 802 and a memory 804 communicatively connected via a system bus 806. The computer system 800 also includes a file system 808 (typically as part of an operating system, not shown) storing one or more files 810, including externally obtained files 812.

The computer system 800 is shown as including a white-list data store 410 and a black-list data store 814. As discussed above, the white-list data store 410 includes signatures of trusted applications, and may further include tagging information corresponding to trusted locations, authors, sources, etc. In contrast, the block-list data store 814 includes signatures of known malware, and may further include tagging information of untrustworthy locations, authors, sources, etc.

Also shown, the computer system may include an obtained files tag store 816 and a rules data store 818. The obtained files tag store 816 stores information regarding files and their origins. The rules data store 818 includes predetermined rules with regard to how to display or act upon downloaded files, based, of course, on its corresponding tagging information. Also, an anti-malware application 820 may optionally be included with the computer system 800 to validate whether or not a file is malware and, as described in more detail below, to optionally maintain the various lists of tagging information, trustworthy and untrustworthy external locations/sources.

Tagging obtained files may be implemented in a variety of manners, by both high level applications and/or low level system functions. For example, in order take advantage of established rules in regard to obtained files, each application that "obtains" files from external sources could be made responsible for tagging the obtained file with origin information. Thus, applications such as the Web browser, e-mail application, data streaming applications. remote file copy applications, and the like would each be required to tag a file, typically according to predetermined tagging requirements, as a file is obtained. Alternatively, file tagging may be embedded/incorporated into various operating functions such that file tagging is performed automatically when obtaining content. For example, operating system API functions that download or copy a file from a remote/external location could be enhanced to tag each file as part of the its download/copy process. Similarly, each file attached to an e-mail could be tagged with the sender's e-mail address when it is are retrieved from a remote location, or when the attached file is saved to the computer system. Moreover, when applications use various methods to obtain files from remote locations, which methods bypass normal operating system functions to tag the file, they would be responsible for tagging the file.

As mentioned above, the rules data store 818 contains rules with regard to displaying, executing, installing, or acting upon obtained files. For example, the rules may specify whether or not a particular image file downloaded from a specific Web page may be displayed according to the Web site's trustworthiness as established by the white-list and black-list data stores. Similarly, rules may specify whether or not a downloaded application can operate freely on the computer system, should be executed within a so-called "sandbox," or should be completely quarantined on the computer system. Of course, information in the white-list data store 410 and black-list data store 812 (as well as the rules that use the information) may be updated as a user's confidence in a particular source (origin, domain, author, etc.) increases or decreases, or as files from that origin prove to be trustworthy. Similarly, information as to trustworthiness, including the information in the white-list data store 410 and black-list data store 812, and the rules data store 818, may be updated or maintained by a third party, such as an anti-malware service installed on the computer or a system administrator. Still further, each of the various data stores (white-list, black-list, and rules) may be user-configurable to heighten or lower the levels of restrictions placed on certain obtained files, or selectively enabled/disabled by the user.

Of course, while various components of an exemplary system 800 have been illustrated and described, these components should be viewed as logical components, not necessarily actual components. It should be appreciated that in an actual embodiment, the illustrated components may be combined with one or more other components, and/or with other components of a typical computer system that are not shown in FIG. 8. Similarly, the various data stores, including the white-list data store 412, the black-list data store 814, the rules data store 818, and the obtained files tag store 816, should be viewed as logical data stores, and in an actual embodiment, each of these may be implemented as one or more separate data stores, or may be combine into one or more larger data stores.

Figure 9A:
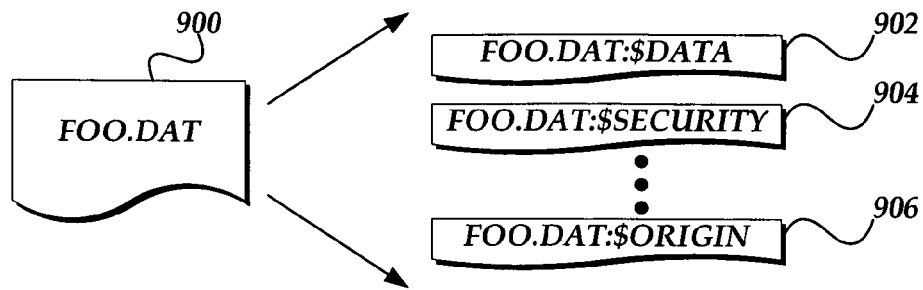
FIGS. 9A-9C are pictorial diagrams illustrating exemplary file system implementations with tagging information.

In regard to how obtained files are tagged, in most instances it is important that the file/subject matter is not modified. Frequently, but not always, modification of the obtained file will invalidate its suitability for its intended use. Accordingly, in many instances tagging information is associated with the content, and this association may be implemented in a variety of fashions. To that end, on some file/operating systems, such as Microsoft's NTFS file system, a single file is actually comprised of multiple data streams. For example, FIG. 9A illustrates an exemplary file 900 in a file system where each file may be comprised of one or more data stream, such as data streams 902-906. As illustrated in FIG. 9A, file 900 comprises at least three separate data streams: a subject matter data stream 902, a security related data stream 904, and a tagging information data stream 906.

Figure 9B:
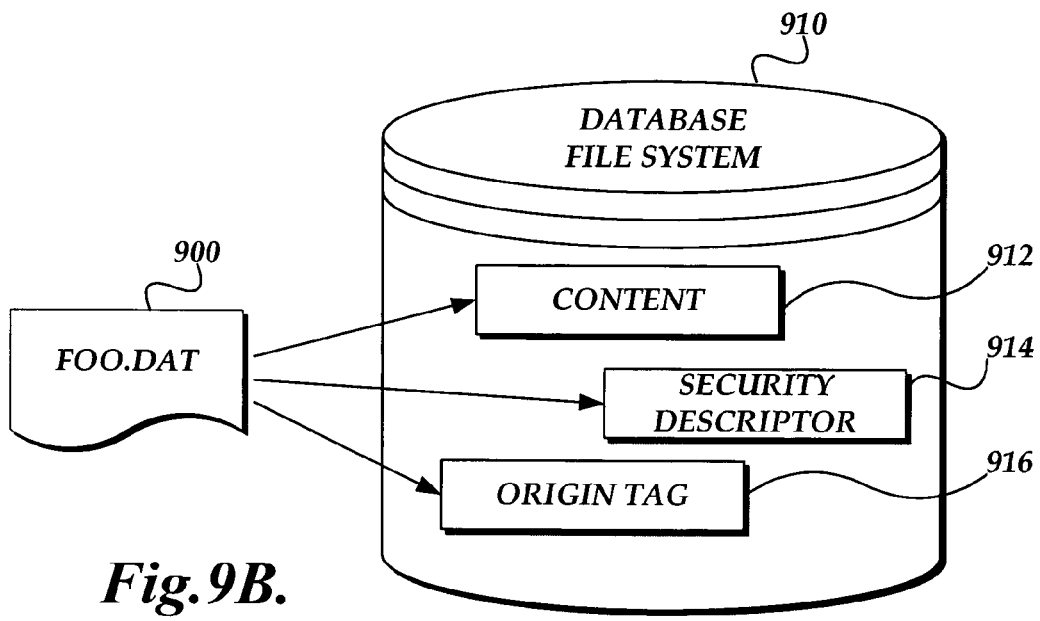
Figure 9C:
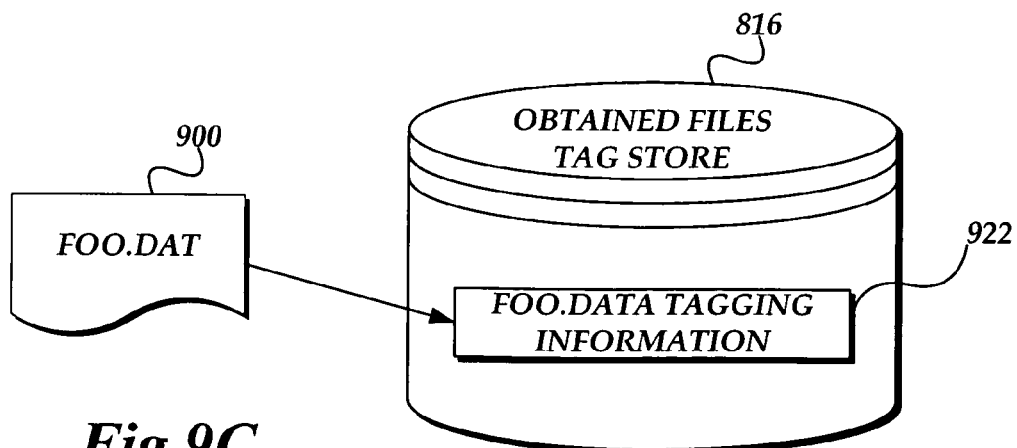

In contrast to file systems supporting multiple streams for a single file, some file system are implemented as a database, where each files is comprises of records and/or fields. Thus, in regard to FIG. 9B, in a database file system a given file 900 may be comprised of multiple records and/or fields, including a file content record 912, an access control list record 914, and a tagging information record 916. The records and fields of each file may be stored as contiguous or non-contiguous data (as shown). Still further, some file systems are not particularly well suited to easily associate tagging information with the file in the file system. Thus, as shown in FIG. 9C and as an alternative to a data stream or database file system, tagging information 922 could be stored separately from the obtained file 900, such as in an obtained files tag store 816. The obtained files tag store 816 stores information associated an obtained file with tagging information for the obtained file.

Clearly, while various embodiments/implementations for storing tagging information have been described, there are numerous ways in which tagging information may be associated with an obtained. file. Accordingly, the above described implementations should be viewed as illustrative only, and not construed as limiting upon the present invention.

Figure 10:
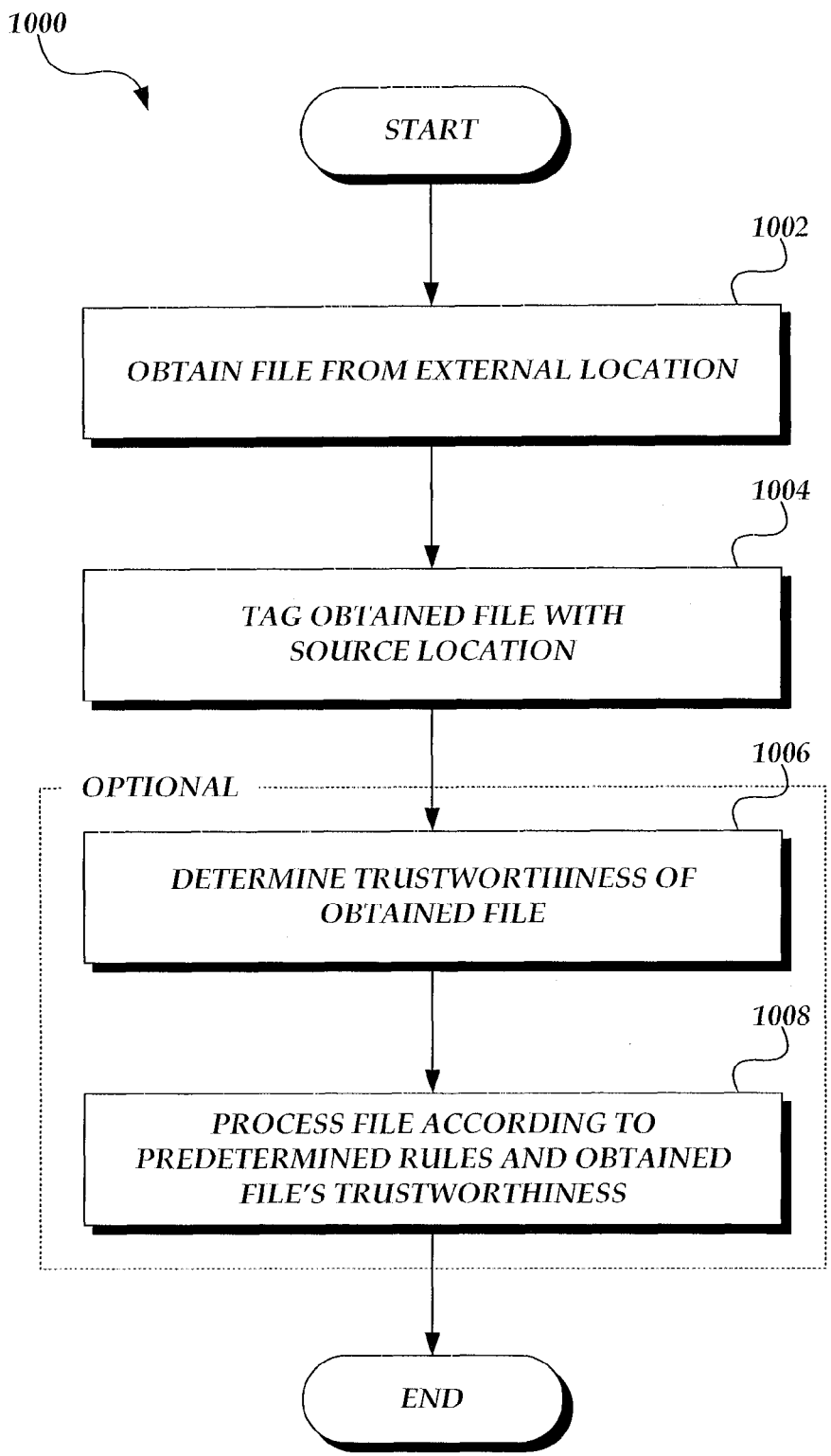
FIG. 10 is a flow diagram illustrating an exemplary tag content routine for tagging obtained content.
Figure 11:
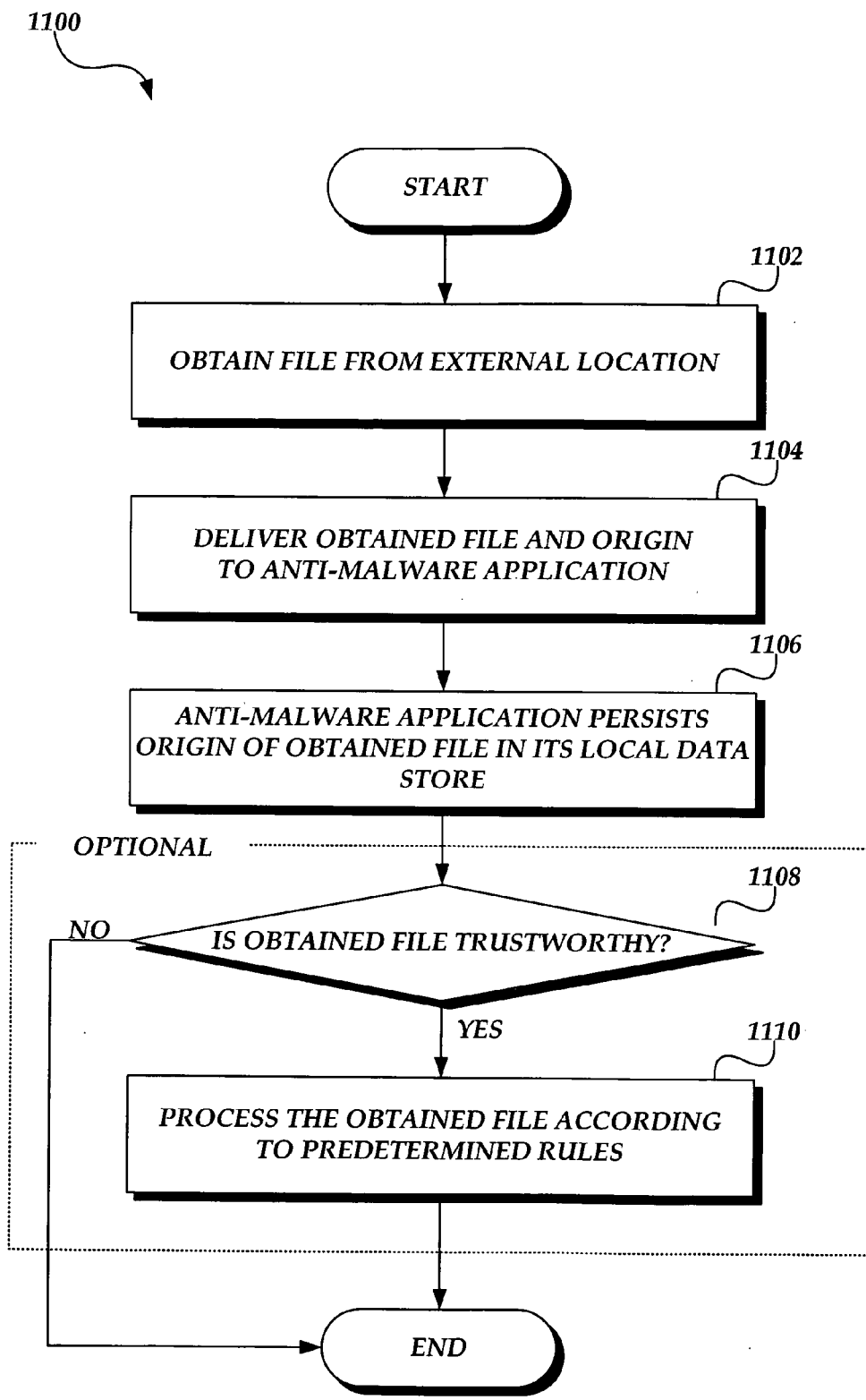
FIG. 11 is an alternative flow diagram illustrating an alternative exemplary tag content routine for tagging obtained content.

In regard to tagging obtained files and content, FIG. 10 is a flow diagram illustrating an exemplary routine 1000 for tagging an obtained file and, optionally applying rules according to the file's origin. Beginning at block 1002, a file is obtained from an external location, i.e., external to the local computer system. At block 1004, the obtained file is tagged with the source location of the file. As described above, this may be done by the high level application that initiates obtaining the file, or by low level functions (i.e., operating system services) called by the high level application to obtain the content, or a combination of both. Moreover, tagging information may be stored in an alternate data stream, as a field or record associated with the file in a database file system, or in a obtained file tag store 816.

Not all obtained files are immediately acted upon (beyond simply storing the file to the local computer system.) If no immediate action is required, the exemplary routine 1000 may terminate. However, quite frequently a file is obtained for immediate action, such as displaying a downloaded image or Web page on the computer, or execution on the computer. Thus, after tagging the file with its source information (e.g., a path, URL, domain, author, etc.), the exemplary routine 1000 optionally processes the obtained file according to predetermined rules from a rules data store 818. More particularly, at block 1006 the exemplary routine 1000 determines the trustworthiness of the obtained file according to its tagging information and the information in the white-list data store 410, the black-list data store 812, and/or the anti-malware application 820.

Once the trustworthiness (or un-trustworthiness) of the file is determined, at block 1008, the obtained file is processed according a set of predetermined rules based on the trustworthiness particularly, and tagging information generally. For example, if, according to the tagging information, the obtained file originated from a source location known to frequently distribute malware, as defined in the black-list data store 814 or by the anti-malware application 820, the predetermined rules may dictate that the obtained file be quarantined, or executed within a so-called sandbox to limit any potential ill effects its display, execution, or installation may cause on the local computer system. Similarly, if the obtained file is identified as a trustworthy file, such as though information in the white-list data store 410, displaying, executing, installing, etc., may be carried out on the local computer system without restrictions.

With regard to the trustworthiness of an obtained file, various means may be employed to rate or establish the trustworthiness of an origin. For example, a value may be associated with an origin of files that indicates the level of trustworthiness for files from that origin (e.g., URI, author, domain, stream, etc.) The gradation of these values may range from a simple trust/no-trust value on up. For example, a grading of values from 0 to 10, with 0 representing a non-trusted origin while 10 represents a completely trusted origin. Moreover, when an origin is unknown (at least to its trustworthiness), some value such as 3 or 4 may be used to indicate the unknown quality of this origin.

Of course, quite frequently, perhaps the majority of the time, an obtained file may not be identified as either trustworthy or untrustworthy according to information in the black-list data store 814, the white-list data store 410, or from the anti-malware application 820. Simply put, the origin of the file is unknown as to whether or not it is trustworthy. However, even though a file's origin may not be evaluated as trustworthy or untrustworthy, predetermined rules from the rules data store 818 could be used to determine how, if at all, the obtained file (whose origin is not known) may be displayed, executed, or otherwise used on the local computer system.

Once the obtained file has been processed, the exemplary routine 100 terminates.

As an alternative to the above described routine 1000, an alternate exemplary routine 1100 for processing an obtained file is presented. Beginning at block 1102, a file is obtained from an external location. At block 1104, the obtained file and its origin are delivered to the computer system's anti-malware application 820. Similar to the process described in regard to FIG. 10, the high level application that initiated obtaining the content from the external location may call the anti-malware application 820 with the obtained file and its origin, or alternative, calling the anti-malware application 820 with the obtained file and its origin may be integrated into the operating system functions that are used to obtain the content.

At block 1106, the anti-malware application 820 persists/stores the obtained file's origin (i.e., "tags" the obtained file). Of course, this may mean that the anti-malware application 820 stores the origin in an alternate data stream, as a record in the database file system, or in an obtained files tag data store 816. Alternatively, while not shown, the anti-malware application 820 may persist the obtained file's origin in a data store accessible only to or by the anti-malware application 820. In fact, placing the obtained file's origin in a data store accessible only to the anti-malware application 820 could lead to greater security. For example, when tagging information is available generally, such as in an alternate data stream, a field in a database, or a record in an obtained files data store 816, a particular malware process may target that information and corrupt it such that predetermined rules would allow that file's execution when it would otherwise not be permitted. However, if the tagging information (i.e., the obtained file's origin) were located in a data store accessible only to the anti-malware application 820, it would be that more difficult to corrupt and compromise the tagging information.

Assuming that immediate action is requested on the obtained file, the obtained file is optionally processed. At decision block 1108, a determination is made as to whether the obtained file is malware. If the anti-malware application stores this information, determining the obtained file's trustworthiness is a matter of querying the anti-malware application 820 regarding the obtained file. The anti-malware application 820 then returns the obtained files trustworthiness.

If the obtained file is trustworthy, at block 1110 the file is processed according to the requested action, i.e., execution, display, installation, etc. Thereafter, or if the obtained file is not trustworthy, the routine 1100 terminates.

Figure 12:
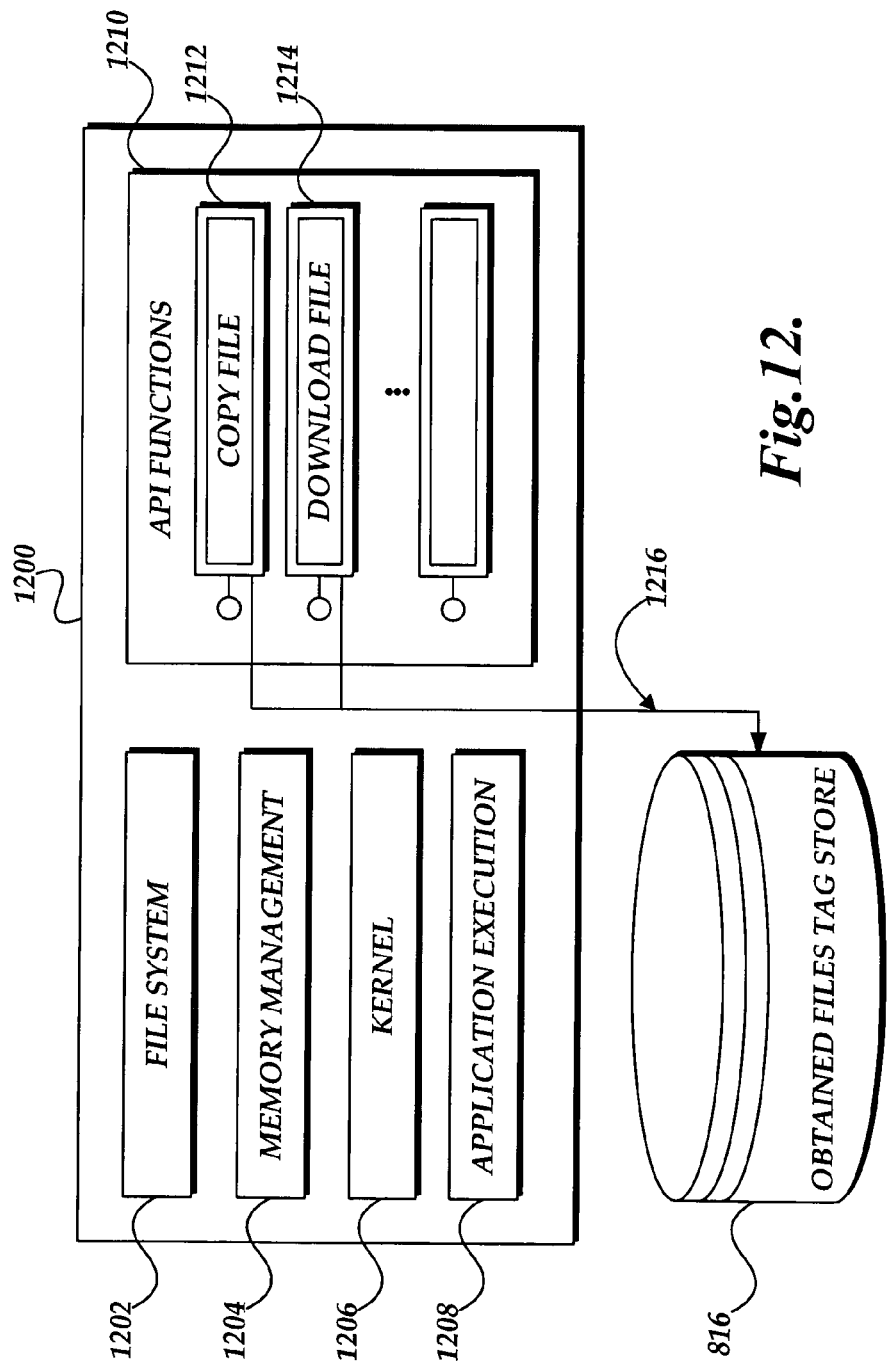
FIG. 12 is a block diagram illustrating aspects of an exemplary operating system configured to automatically tag an obtained file with tagging information.

As mentioned above, tagging an obtained file may be implemented at the operating system level such that when a file is obtained, it is automatically tagged. FIG. 12 is a block diagram illustrating aspects of an exemplary operating system 1200 configured to automatically tag an obtained file with tagging information.

The illustrated operating system includes typical logical components such as a file system component 1202, a memory management component 1204, an operating system kernel component 1206, an application execution component 1208, and a plurality of API functions 1210 that are callable by executing applications.

Key API functions, such as copy 1212, URL download 1214, and the like are configured to automatically tag each file, i.e., store the origin information for each obtained file, such as storing the tagging information in the obtained files tag store 816, as indicated by arrow 1216 of FIG. 12.

While a very simplified, logical set of operating system components have been shown in FIG. 12, it is for illustration purposes only, and should not be construed as limiting upon the present invention. Clearly, those skilled in the art will appreciate that nearly all operating systems are very complex system. However, as operating systems are known in the art, the simplification shown in FIG. 12 is to illustrate that various functions offered by the operating system are configured to automatically provide tagging information for each obtained file.

While various embodiments, including the preferred embodiment, of the invention have been illustrated and described, it will be appreciated that various changes can be made therein without departing from the spirit and scope of the invention.

The embodiments of the invention in which an exclusive property or privilege is claimed are defined as follows:

1. A computer system for providing enhanced security with regard to obtained files, the computer system comprising:
 a processor; and
 a memory storing instructions that, when executed by the processor, implement an operating system configured to:
  provide at least one application-callable operating system function that, when called by an application, obtains a user-modifiable file from an external location;
  generate, by the at least one application-callable operating system function as part of a process of obtaining the user-modifiable file from the external location for the application, tagging information regarding a source of the user-modifiable file; and
  tag, by the at least one application-callable operating system function as part of the process of obtaining the user-modifiable file from the external location for the application, the user-modifiable file with the tagging information regarding a source of the user-modifiable file, whereby file tagging is performed automatically by the operating system when obtaining the user-modifiable file for the application,
 wherein the computer system is further configured to:
  determine a trustworthiness of the user-modifiable file based at least in part on the tagging information; and
  process the user-modifiable file based at least in part on the trustworthiness.

2. The computer system of claim 1 further comprising a rules data store describing rules for acting upon obtained files according to the obtained file's trustworthiness; and
 wherein the computer system is configured to act upon the obtained file according to a rule in the rules data store corresponding to the trustworthiness.

3. The computer system of claim 2 further comprising a black-list data store comprising information regarding untrustworthy sources, and wherein the computer system determines the trustworthiness by determining whether the source of the user-modifiable file, as described in the tagging information, is found in the black-list data store.

4. The computer system of claim 3, further comprising an anti-malware component configured to dynamically update at least one rule stored in the rules data store and/or at least some of the information regarding untrustworthy sources in the black-list data store.

5. The computer system of claim 2 further comprising a white-list data store comprising information regarding trustworthy sources, and wherein the computer system determines the trustworthiness by determining whether the source of the user-modifiable file, as described in the tagging information, is found in the white-list data store.

6. The computer system of claim 5, wherein at least one rule stored in the rules data store and/or at least some of the information regarding trustworthy sources in the white-list data store is configurable by a user of the computer system.

7. The computer system of claim 1, wherein a file is stored in a file system as one or more separate data streams in the file system, and wherein the operating system is configured to tag the user-modifiable file with the tagging information by storing information regarding the source of the user-modifiable file as one of the one or more separate data streams.

8. The computer system of claim 1, wherein a file is stored as one or more records in a file system database, and wherein the operating system is configured to tag the user-modifiable file with the tagging information by storing information regarding the source of the user-modifiable file as one of the one or more records in the file system database.

9. The computer system of claim 1 further comprising an obtained files tag store for storing tagging information corresponding to each obtained file on the computer system, and wherein the operating system is configured to tag the user-modifiable file with the tagging information by storing information regarding the source of the user-modifiable file in the obtained files tag store.

10. The computer system of claim 1, wherein the computer system is further configured to identify the source of the user-modifiable file based at least in part on information regarding the external location from which the user-modifiable file is obtained.

11. The computer system of claim 1, wherein the at least one application-callable operating system function is selected from a group consisting of: copy and download.

12. A method for enhancing the security of a computing device comprising an operating system, the method comprising:
 obtaining, by at least one application-callable operating system function, a first user-modifiable file from a first external source;
 upon obtaining the first user-modifiable file, generating, by the at least one application-callable operating system function that obtains the first file, tagging information identifying a source of the first user-modifiable file;
 tagging, by the at least one application-callable operating system function that obtains the first user-modifiable file, the first user-modifiable file with the tagging information identifying a source of the first user-modifiable file;
 obtaining, by an application running on the computing device, a second user-modifiable file from a second external source, the second user-modifiable file obtained independent of calling the at least one application-callable operating system; and
 tagging, by the application that obtains the second user-modifiable file, the second user-modifiable file with tagging information identifying a source of the second user-modifiable file.

13. The method of claim 12 further comprising:
 determining a trustworthiness of at least one of the first user-modifiable file or the second user-modifiable file according to the tagging information; and
 processing the at least one of the first user-modifiable file or the second user-modifiable file according to predetermined rules based on the trustworthiness.

14. The method of claim 13, wherein determining the trustworthiness comprises comparing the tagging information to a white-list of trustworthy sources.

15. The method of claim 14, wherein determining the trustworthiness further comprises comparing the tagging information to a black-list of untrustworthy sources.

16. The method of claim 12, wherein tagging at least one of the first user-modifiable file or the second user-modifiable file with tagging information comprises storing an origin of the at least one of the first user-modifiable file or the second user-modifiable file in an alternate data stream of the at least one of the first user-modifiable file or the second user-modifiable file.

17. The method of claim 12, wherein the tagging information comprises at least one information item selected from a group consisting of: a Uniform Resource Identifier of at least one of the first user-modifiable file or the second user-modifiable file, an author of the at least one of the first user-modifiable file or the second user-modifiable file, and a domain from which the at least one of the first user-modifiable file or the second user-modifiable file was obtained.

18. The method of claim 12, further comprising:
identifying at least one of the source of the first user-modifiable file or the second user-modifiable file based at least in part on information regarding a corresponding one of the first external location or the second external location.

19. At least one computer-readable storage device having encoded thereon instructions that, when executed by a processor, implement:
an operating system comprising a plurality of application-callable functions for obtaining content from external locations, wherein each of the plurality of application-callable functions for obtaining content from external locations is configured to:
upon obtaining a user-modifiable file from an external location, generate tagging information comprising a source of the user-modifiable file; and
associate with the user-modifiable file the tagging information comprising the source of the user-modifiable file.

20. The computer-readable storage device of claim 19, wherein the operating system associates tagging information with each corresponding user-modifiable file by storing the tagging information in an alternate data stream associated with the corresponding user-modifiable file.

21. The computer-readable storage device of claim 19, wherein the operating system is further configured to process the user-modifiable file according to predetermined rules based on a trustworthiness of the user-modifiable file, and wherein the trustworthiness is determined according to the tagging information and at least one list identifying a source with the trustworthiness.

22. The computer-readable storage device of claim 21, wherein at least one of the predetermined rules and/or the at least one list is dynamically updated by an anti-malware component.

23. The computer-readable storage device of claim 21, wherein at least one of the predetermined rules and/or the at least one list is configurable by a user.

24. The computer-readable storage device of claim 19, wherein the operating system is further configured to identify the source of the user-modifiable file based at least in part on information regarding the external location from which the user-modifiable file is obtained.

* * * * *